Figure 1:
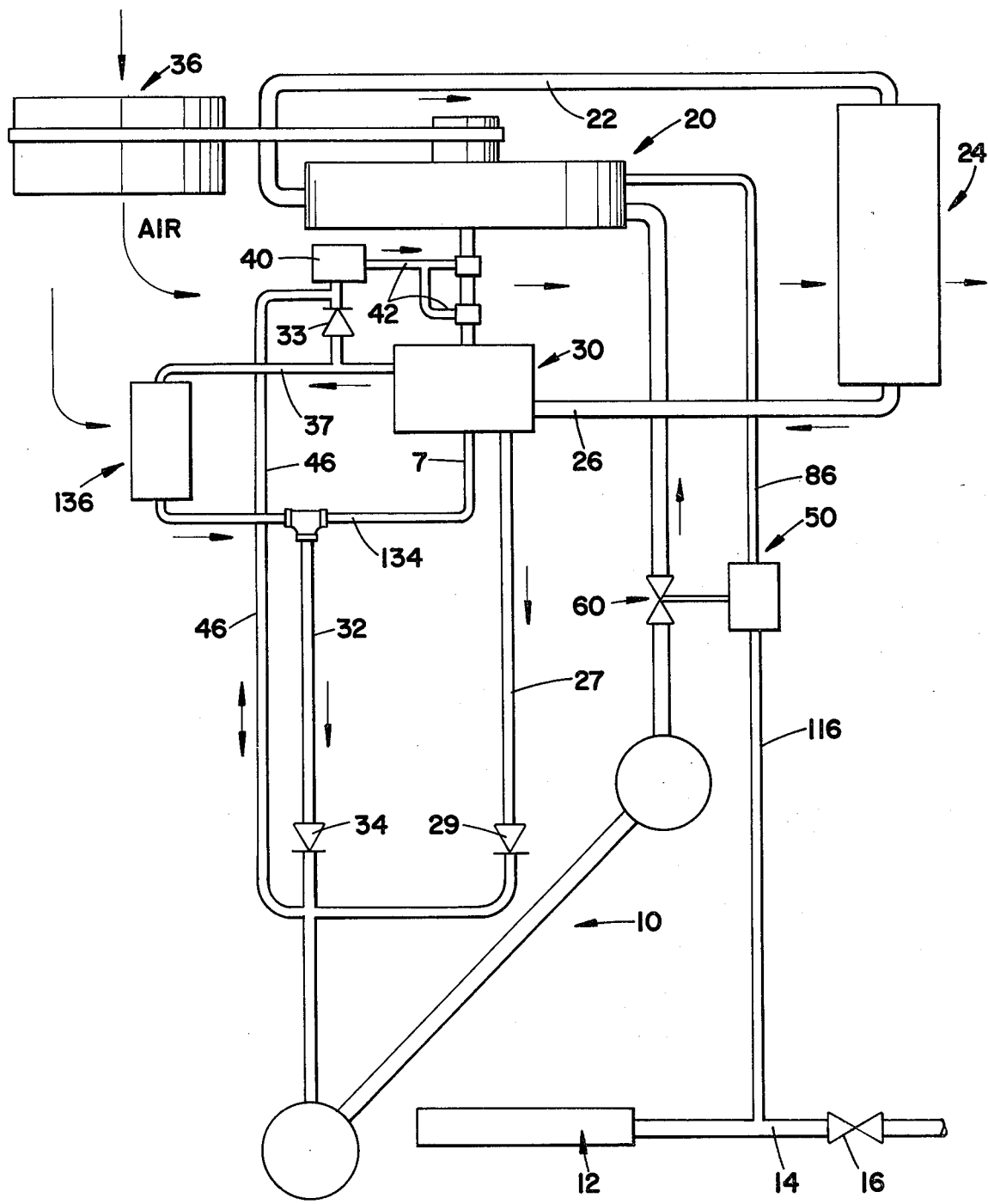

United States Patent [19]

Primeau

[11] 4,375,154

[45] Mar. 1, 1983

[54] AIR HEATING SYSTEM

[76] Inventor: John J. Primeau, 19800 Seminole Rd., Euclid, Ohio 44117

[21] Appl. No.: 215,562

[22] Filed: Dec. 11, 1980

[51] Int. Cl.³ .................. F01B 31/00; F01D 00/00; F01K 19/00
[52] U.S. Cl. .................. 60/657; 60/646; 60/648; 60/669; 60/670; 60/692; 60/693
[58] Field of Search .......... 60/643, 657, 693, 646, 60/657, 669, 670, 648; 122/406 A; 237/67, 12.1, 9; 126/101

[56] References Cited

U.S. PATENT DOCUMENTS

| 910,036 | 1/1909 | Wolfson | 60/96 |
| 1,558,223 | 10/1925 | Behringer et al. | 60/690 |
| 2,065,251 | 12/1936 | Sweeley et al. | 126/101 |
| 3,365,133 | 12/1965 | Norton et al. | 237/12.1 |

FOREIGN PATENT DOCUMENTS

| 500598 | 3/1954 | Canada | 122/406 A |
| 433993 | 1/1912 | France | 237/9 |

*Primary Examiner*—William R. Cline
*Assistant Examiner*—John F. McNally

[57] ABSTRACT

A self-starting, fuel-fired, air heating system including a vapor generator, a turbine, and a condenser connected in a closed circuit such that the vapor output from the vapor generator is conducted to the turbine and then to the condenser where it is condensed for return to the vapor generator. The turbine drives an air blower which passes air over the condenser for cooling the condenser. Also, a condensate pump is driven by the turbine. The disclosure is particularly concerned with the provision of heat exchanger and circuitry for cooling the condensed fluid output from the pump prior to its return to the vapor generator.

5 Claims, 3 Drawing Figures

AIR HEATING SYSTEM

The Government has rights in this invention pursuant to Contract No. 468952-5 awarded by the U.S. Department of Energy.

The subject invention is directed toward the art of vapor generating systems and, more particularly, to a fuel fired, closed loop, hermetically sealed Rankine cycle turbine power unit.

The invention is particularly suited for use in a totally self-contained, self-powered air heating system for residential space heating requirements and will be described with particular reference thereto; however, as will become apparent, the invention is capable of broader application and could be used in a variety of different Rankine cycle power units.

A recently developed residential heating unit includes a closed loop, hermetically sealed vapor generator and turbine unit (comprising a Rankine cycle power unit) fired by a gas fuel burner. The unit generates relatively low pressure steam which is used to drive the turbine which in turn drives an air circulating blower and a condensate return pump. The vapor discharging from the turbine is passed through a condenser or heat exchanger position in the air flow stream and provides the primary means of heating the air supplied to the heated rooms or space.

As can be appreciated, there is frequent cycling of the operation of the vapor generator turbine unit because of the usual on/off thermostat response to the heating requirements of the space being heated. Consequently, the vapor generator turbine unit must be started and stopped at somewhat frequent intervals if desired temperatures within a suitable range are to be maintained within the heated space.

In the operation of any vapor generator system, varying loads and on/off cycling place special requirements on the system. Additionally, in systems of the type referred to as employed in residential heating applications, the turbine and vapor generator unit are preferably operated at very low pressure and, at times, at subatmospheric pressure. For example, in one known type of unit the fluid or liquid within the vapor generator is vaporized to a pressure of approximately 1.7 atmospheres (absolute). As the vapor enters the turbine and expands, it drops to a pressure of approximately 0.4 atmospheres (absolute). After expansion and subsequent condensation it is conducted to an intake of a condensate return pump and its pressure raised to approximately 2 atmospheres to return as liquid to the vapor generator.

The liquid moving through the low pressure portion of the circuit is often very near its vaporizing point because of its respective pressure and temperature states. A slight drop in pressure can cause the liquid to flash into vapor. Similarly, a slight increase in temperature can also cause it to flash into vapor. This produces problems with respect to the condensate pump because if the vapor is flashing at the time it is entering or is in the pump, the pump can no longer function. Furthermore, in small residential type units the liquid level head is generally inadequate to suppress flashing at the pump inlet. Under these circumstances a vapor flashing or vapor lock takes place and the unit must then shut down due to its inability to return the fluid to the vapor generator. Finally, as is common with gas-fired vapor generators, the vapor generator employed in the above referenced unit operates with reduced flue temperature when the condensate return is also at reduced temperature. The lower the flue temperature, the more efficient is the operation of the vapor generator. Therefore, it is desirable to supply the condensate return at as low a temperature as possible, so long as cooling of the condensate return is achieved without loss of the corresponding heat for useful purposes.

The subject invention overcomes the above and other problems through the use of a special circuit arrangement between the condensate pump and the vapor generator in conjunction with a particular method of operating the vapor generator.

In accordance with one aspect of the invention an independent liquid cooling circuit is provided at the condensate pump discharge. Cooling of the condensate is achieved through useful exchange of heat to the air being delivered to the heated space. Cooled, pressurized condensate is returned to the pump inlet so as to maintain a constant flow of subcooled fluid at the pump inlet thereby maintain the pump in a constantly liquid, primed condition.

In addition to the above it is also preferred to interconnect the cooled discharge of the condensate pump and the vapor generator with the turbine bearings in a manner which permits flow of subcooled bearing lubricant fluid to the turbine bearing whenever the boiler or vapor generator is being fired and irrespective of whether or not the turbine is rotating. Likewise, the system also permits flow of cooled lubricant fluid to the turbine bearings whenever the turbine is rotating even if the vapor generator is not being fired as when the unit is coasting down. Finally, the cooled condensate is also available as cooled condensate return for the vapor generator.

Figure 2:
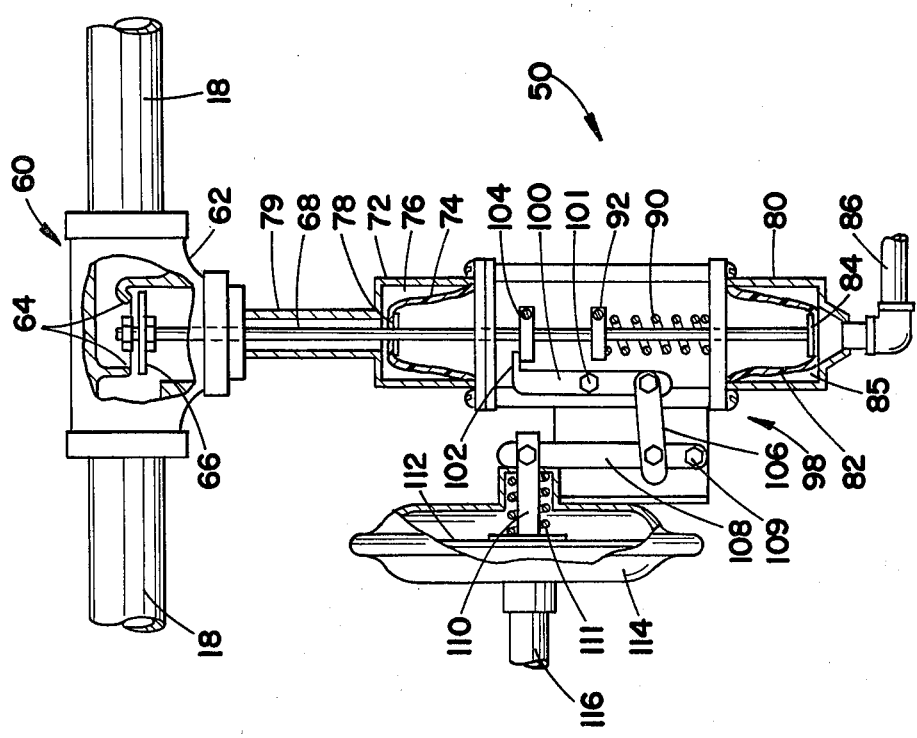
Figure 3:
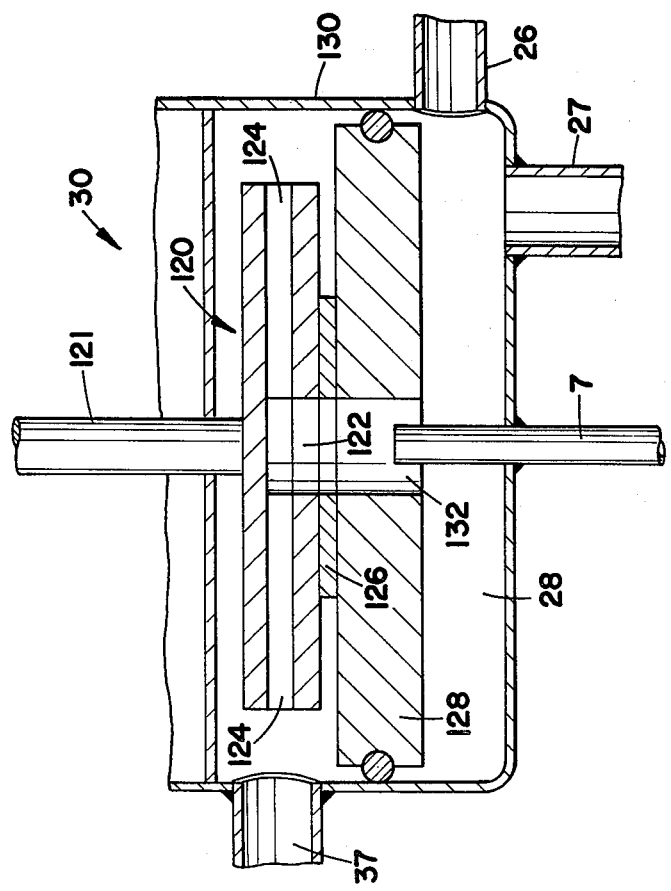

The preferred structure and method provided for achieving the above objects and desired results will become apparent from the following description when read in conjunction with the accompanying drawings wherein;

FIG. 1 is an overall diagrammatic view showing a typical embodiment of a self-contained, fuel-fired turbine-vapor generator unit adapted for residential heating and including features of the invention; and, FIG. 2 is a detailed view of a preferred form of a vapor pressure hold-back valve used in the system of FIG. 1; and FIG. 3 is an enlarged cross-sectional view of a preferred form of condensate pump used in the system of FIG. 1.

Referring more particularly to the drawings wherein the showing are for the purpose illustrating a preferred embodiment of the invention only, and not for the purpose of limiting the same. FIG. 1 shows a relatively conventional vapor generator 10 which is fired by a gas burner 12 connected to a source of gas through a line 14 controlled by a main control valve 16. Vapor produced by the vapor generator 10 is conducted through a line 18 to a turbine or similar rotary, vapor power expander, 20. As can be appreciated, in passing through the turbine 20 the vaporized fluid expands, performs work, and drops in pressure. From the turbine, the discharged vapor is passed through line 22 to a heat exchanger or condenser 24 where it is condensed back to a liquid and supplied through a line 26 to a sump 28. The liquid within the sump 28 can flow by gravity through line 27 and check valve 29 to the intake of vapor generator 10. However, under most operating conditions, the liquid is pumped from the sump 28 by a centrifugal condensate pump 30 which discharges through a line 32 to a lower or inlet end of the vapor generator 10. As shown, a check valve 34 is positioned in line 32 to prevent reverse flow of liquid from the vapor generator 10.

In the embodiment under consideration, the turbine 20 has its shaft directly connected to the condensate pump 30. Consequently, whenever the turbine 20 is operating it is also driving the condensate pump 30. Additionally, the turbine 20 is connected through a belt drive with a fan or blower 36 positioned and arranged to take air from the space being heated and pass it over the turbine housing and the condenser or heat exchanger 24 for return back to the heated space.

As can be appreciated, in order to meet the varying heating requirements of typical residence or other space heating needs, the unit must have a varying heat energy output. This can be accomplished by modulating the firing of the generator or, alternatively, by cycling the unit on and off. In the subject embodiment a simple on/off control system is disclosed, which will operate in conjunction with known types of on/off thermostats. As can be appreciated, with frequent on/off cycling of the unit, frequent start-up and shut-down of the system results. Additionally, because of the desire to use the system for residential heating and because of efficiency considerations, it is desirable to have the system operate at very low and even subatmospheric pressures. Moreover, if the turbine and blower rotary motion were to cease immediately upon discontinuation of burner firing, a substantial amount of heat energy would remain in the system to be lost by natural draft up the burner vent and not supplied to the heated space.

An additional requirement of a system of the type described is that the turbine bearings be properly lubricated whenever the turbine is operated. While it would be possible to provide a separate independently driven pump unit for supplying turbine bearing lubricant, provision of such a pump would obviate one of the major advantages of the system of the type described. That is, the subject system is preferably arranged and constructed such that it is completely self-contained and needs no additional external power such as electricity. For this reason, the condensate pump 30 has a circuit connection to ensure flow of fluid to the turbine bearings. As shown the discharge line 37 from the condensate pump 30 is connected through a check valve 38 and a fluid filter 40 with a line 42 leading to the turbine bearings. The turbine bearings are relatively conventional, fluid lubricated bearings (not shown) which carry the radial loads of the turbine. The bearings have narrow passages which offer a substantial restriction to fluid flow and the fluid passing through the bearings returns through lines (not shown) to the sump 28. As can be appreciated, so long as the turbine and condensate pump are operating, a suitable supply of bearing lubricant fluid is supplied to the bearings. However, on vapor generator start-up when the turbine and, accordingly, the condensate pump are not operating, it is still necessary to have lubricant fluid to the bearings or otherwise the turbine would start-up with dry bearings and produce bearing damage.

To assure lubricant flow to the bearings when the vapor generator is being started up, a line or tube 46 is directly connected from the vapor generator to a point between check valve 38 and filter 40. Additionally, a vapor pressure hold-back valve 50 is positioned in line 18. The preferred form of valve 50 will subsequently be described and its function explained in detail relative to other operations of the vapor generator; however, for present purposes it is sufficient to note that the hold-back valve 50 is controlled so that it does not open until the vapor generator has reached a predetermined operating pressure level. Consequently, the turbine 20 does not receive vapor until the vapor generator has attained a predetermined pressure. While pressure is building up within the vapor generator a small portion of the fluid within the generator is forced by vapor generator pressure through line 46 and filter 40 to the line 42. Thus, a full bearing lubricant fluid supply is passing through the bearings prior to the time that the hold-back valve 50 opens and turbine rotation begins. When turbine rotation begins, the condensate pump 30 is also driven and discharges fluid through check valve 38 to filter 40 and thence to the line 42. In addition, as can be appreciated, even when the vapor generator firing ceases, a supply of vapor will continue to be supplied for a period of time. The direct interconnection of the turbine and the condensate pump 30 assures that so long as the turbine and condensate pump are rotating sufficient to overcome bearing lubrication system resistance, bearing lubricant fluid will be supplied through check valve 38, filter 40 and line 42.

As mentioned earlier, hold-back valve 50 is arranged to prevent flow of vapor from the generator 10 to the turbine 20 until the generator has reached predetermined pressure level. In addition, hold-back valve 50 is arranged such that upon termination of the supply of fuel to the burner 12 it will not close even after all of the vapor being generated in the vapor generator has been passed through the turbine and the entire unit is cooled down substantially by the flow of air from blower 36 through the unit. This assures that all heat generated within the boiler unit is supplied to the heated space. That is, all heat is extracted from the unit prior to the time it completely shuts down so that draft heat losses by flow through the unit and up the stack are substantially eliminated or greatly reduced.

Many different types of hold-back valves could be provided. However, the preferred form of hold-back valve is shown in FIG. 2. As shown therein, the hold-back valve comprises a standard valve unit 60 including a body 62 and a seat 64 which is opened and closed by a valve disc 66. The valve disc 66 is slidingly operated by a push rod 68 connected to an operating assembly 70. The operating assembly 70 includes a first housing 72 having a bellows element 74 mounted therein and cooperating with the housing 72 to define an external sealed pressure chamber 76. The push rod 68 passes through bellows 74 and is sealed relative thereto by being welded or otherwise sealing connected to the upper end of the bellows at point 78. Pressure within line 18 on the upstream side of valve 60 is permitted to act within chamber 76 by passing about the push rod 68 and within the tube 79.

At the opposite end of the operating unit 70 a second chamber defining housing member 80 is formed and likewise has a bellows 82 mounted therein in a manner to provide a sealed chamber 85. The lower end of the push rod 68 is welded or otherwise positively connected to the bellows at member 84. chamber or pressure space 85 is connected through a line 86 to the lower pressure side of the turbine housing so that turbine discharge pressure acts against the bellows 82.

The push rod 68 is continually biased to a valve closing direction by a spring 90 which acts against an adjustable stop 92 formed or carried on the push rod 68. Selective movement of the stop 92 acts to vary the spring force.

As can be appreciated, by adjustments of the biasing force of spring 90 it is possible to preset the difference in pressure between the vapor generator and the turbine housing required to cause valve opening. To explain, note that the pressure within the vapor generator acts against bellows 74. This is counter-balanced by the spring pressure 90 and the turbine housing pressure as sensed by bellows 82. It should also be appreciated that under negative pressure within the turbine housing the pressure upon bellows 82 is negative also thereby increasing the forces acting against spring 90. Thus, it is possible to maintain a constant pressure differential between the turbine outlet pressure and the vapor generator pressure.

The arrangement thus far described prevents opening of the valve element 66 until the generator has reached some predetermined pressure differential relative to the turbine outlet. This assures immediate start-up of the turbine without a slow and gradually increasing vapor supply to the turbine which would produce improved start-up and could result in a substantial amount of vapor passing through the turbine prior to the turbine's start-up.

To assure that the valve 60 remains open even after the burner 12 has stopped firing, an actuating assembly 98 is interconnected between the valve operator 70 and the gas supply to the burner. Note that the assembly 98 includes a first lever member 100 which is suitably mounted from a bracket 99 for pivotal movement about point 101. Member 100 has inwardly extending finger portion 102 which (when in the position shown in FIG. 2) extends over a stop member 104 carried on push rod 68. The stop member 104 and finger 102 are related such that the valve cannot fully close with finger 102 is the position shown. The member 100 is pivoted in a counterclockwise direction to remove finger 102 from its stop position by a link 106 connected between member 100 and a second pivoted lever 108. Lever 108 is pivoted about point 109 and has its upper hand connected to an operating rod 110 extending from a gas pressured diaphragm assembly 112. As shown, pressure of gas supplied to burner 12 is also conducted to the pressure chamber 114 of diaphragm assembly 112. The operation of the hold-back valve 50 and its relationship to the overall functioning of the system can best be understood by joint reference to FIGS. 1 and 2. When the valve is in the solid line position shown in FIG. 2, the previously mentioned finger 102 prevents closing of the valve at element 66. Thereafter, when there is a demand for heating and main gas valve 16 opens, gas pressure is supplied through line 116 to the left side of diaphragm 112. This causes the diaphragm 112 to move to the right against the bias of spring 110 pivoting lever 108 in a clockwise pivoting of the lever 110. This retracts the finger 102 from above the stop 104 and permits the valve element 66 to be moved to the closed position by the bias of spring 90. Since the burner has just begun firing vapor pressure has not yet built up in the vapor generator. Accordingly, the valve remains closed and as boiler pressure builds up fluid is supplied through line 46, filter 40 and line 42 to lubricate the turbine bearings. When a suitable pressure in line 18 has been reached, the pressure within the chamber 76 is sufficient to overcome the bias of spring 90 and the valve 66 moves to an open position. Thereafter, when the main control valve 16 is closed either manually or in response to a temperature control signal from the heated space, the bias of spring 110 causes the diaphragm to move to the left and the lever 108 to be moved in a counterclockwise direction about point 109. This movement causes the stop finger 102 to be pivoted to the right to the position above stop member 104. As the generation of vapor within the vapor generator 10 decreases, the valve member will move toward the closed position until the stop 104 engages finger 102. At this time the valve is still open and all vapor within the vapor generator continues to flow therefrom maintaining continued rotation of the turbine and the blower 36 and the pump 30. The continued flow of air from blower 36 over the heated surfaces within the unit and the condenser surface 24 extracts the last heat from the unit and conducts it to the heated space. Thus, the hold-back valve prevents the start-up of the turbine and blower until a predetermined pressure is reached while simultaneously permitting continued flow of vapor from the unit even after firing has ceased, thereby substantially increasing the efficiency of the unit.

As mentioned earlier, the described system preferably operates at very low and, during certain portions of the cycle, subatmospheric pressures. The fluid moving through the lower pressure portions of the cycle, specifically, the condensate return lines, is at or very near its vaporizing point because of the temperature and pressure relationship. Thus, under certain cycle conditions the vapor in this portion of the circuit can vaporize or flash. If flashing takes place, the fluid supplied to the condensate pump or taken into the intake of the condensate pump can vaporize and a vapor lock could take place in the pump.

To understand how undesired flashing is prevented in the subject system, reference is made to FIGS. 1 and 3. As best shown in FIG. 3, the condensate pump 30 includes a pump rotor 120 carried at the lower end of turbine shaft 121. Rotor 120 includes a central intake opening 122 and a plurality of radially extending passages 124. The downward thrust of the turbine and the pump rotor 120 are carried by suitable land or thrust bearing members 126 supported upon a carbon disc 128 sealingly connected within the lower end of the housing 130 which defines the sump 28.

Condensate returning to the sump 28 through line 26 is drawn into the pump rotor 120 through the opening 132. It is impelled centrifugally through paths 124 to the outlet line 37. At normal operating speed the condensate pump 30 has a capacity greater than the fluid required to operate the vapor generator and the turbine. Consequently, the condensate pump will try to pump the fluid within sump 28 to a level below the inlet 132 to a pump housing. At this level suction will break at the inlet and the pump can no longer draw fluid into the rotor. To prevent a vapor lock condition when the sump starts filling again, the subject invention provides an eductor jet 7 which is connected to a line 134 with the discharge 37 of the condensate pump. Consequently, so long as the pump is operating a constant priming flow of liquid is provided to the inlet.

Even with the eductor operating, the condensate pump could lose its prime as a result of flashing from the heat of the turbine exhaust and the like. For this reason it is imperative that line 134 include a portion which can be referred to as a heat exchanger or cooling section 136 positioned in the cool return air flow upstream of the condenser in an air flow direction. This heat exchanger 136 cools the condensate which is supplied through the eductor. This cooled fluid prevents formation and/or continuation of the vapor lock or flashing at the condensate pump inlet.

A primary consideration of the condenser pump capacity is that it must satisfactorily pump the housing sump as dry as possible during the coast-down period after burner 12 is shut down. As the coast-down period is in progress, the condenser 24 continues to drain the fluid back to the sump. Also, bearing lubricant fluid is also draining back to the sump. In order for the turbine 20 to make a firm start and accelerate rapidly to operating speed, there must be no fluid drowning the rotor and inhibiting speed. Therefore, the condensate pump must provide a sump pump-out capability to exceed the final drainage requirements during coast down. This capability provides the furnace with the necessary future of being able to hot start at any time after the previous cycle of operation without the necessity of waiting for the fluid to drain out of the sump and back to the vapor generator based on gravity alone.

In addition to the other advantages afforded by the condensate cooling circuit the circuit serves to cool the condensate return that is supplied to the vapor generator. The circuit cools the condensate to a lower temperature than at which it exited the condenser 24.

In a counterflow type vapor generator the condensate return is heated by the flue products just before they exit to the vent. The condensate heater is, in effect, an economizer, to use a central station term in the same context. The final flue temperature is, then, directly related to the temperature of the condensate return.

The condensate cooler 136 preheats the air before it reaches the condenser. The use of the cooler 136 in conjunction with the counterflow vapor generator results in preheating the air with flue heat. It is achieved by two liquid/gas heat exchangers, rather than one gas/gas heat exchanger. A gas/gas heat exchanger would be very cumbersomes to incorporate in a compact package.

In a Rankine cycle device applied strictly to producing shaft power, a condensate cooler would represent a net loss of energy from the device. Within the context of the subject furnace system, however, there is a net gain, because the heat is usefully applied within the device and the flue temperature is reduced as a result.

Having thus described my invention, I claim:

1. In a self-starting, fuel-fired, air heating system including a vapor generator, a turbine, and a condenser connected in a closed circuit such that the vapor output from the generator is conducted to said turbine and then to said condenser where it is condensed and returned to said boiler, and further including an air blower means driven by said turbine for causing a flow of air over said condenser, and a condensate pump also driven by said turbine for returning the condensed vapor to the vapor generator, the improvement comprising a heat exchanger connected to receive at least a portion of the condensed fluid exiting from said pump for cooling said fluid and returning a portion of the cooled fluid to the inlet of said pump and further including a fluid flow line means connected to permit gravity flow of condensed fluid from said condenser to said vapor generator when said turbine and pump are not operating.

2. The improvement as defined in claim 1 where said heat exchanger is connected to receive substantially all of the output from said pump.

3. The improvement as defined in claim 1 wherein said heat exchanger is mounted to have air from said blower means passed thereover prior to said air passing over said condenser.

4. The improvement as defined in claim 2 wherein said heat exchanger is connected such that the major portion of the cooled fluid exiting therefrom is returned to the vapor generator.

5. The improvement as defined in claim 1 wherein said turbine includes fluid lubricated bearings and parallel connection means are provided such that lubricating fluid can be supplied from said vapor generator or said pump.

* * * * *